United States Patent [19]
Dula

[11] Patent Number: 5,738,261
[45] Date of Patent: Apr. 14, 1998

[54] VEHICLE HITCH FOR SECURING A HAND TRUCK, CART OR OTHER SMALL LOAD

[76] Inventor: Tom Dula, 5102 Valencia Dr., Orange, Calif. 92869

[21] Appl. No.: 727,059

[22] Filed: Oct. 8, 1996

[51] Int. Cl.[6] ............................. B60R 9/11; B60R 11/00
[52] U.S. Cl. .................. 224/533; 224/282; 224/512; 224/514; 224/530; 224/532; 224/536; 224/537; 280/495; 280/500; 414/462
[58] Field of Search ...................... 224/533, 536, 224/280, 282, 924, 935, 537, 530–532, 511, 512, 514–516, 519, 42.38, 545, 548, 552, 553, 555, 558, 560, 570, 571; 248/221.11, 222.11, 316.5; 280/495, 500, 502, 505, 510–512, 514, 769; 414/462

*Primary Examiner*—Henry J. Recla
*Assistant Examiner*—Timothy L. Maust
*Attorney, Agent, or Firm*—Roy A. Ekstrand

[57] ABSTRACT

A base plate is securable to a vehicle bumper using a threaded bolt attachment and supports a rectangular support which in turn is secured to and supports a planar top plate. A front plate is angularly positioned between the top plate and base plate to provide the combined support structure of a vehicle hitch securable to a vehicle bumper. A transversely extending saddle plate is spaced from the front plate at the lower edge thereof defining a lower channel therebetween. A pair of latch arms each defining respective notches therein are pivotally supported upon the vertical support and are coupled to a transversely extending angularly disposed cam plate. A return spring is operative to urge the latch arms to an upward locking position. An elongated handle is secured to one of the latch arms and extends downwardly therefrom. A pool cart or the like having an upper tube and lower tube is received within the latch arm notches and lower channel respectively to secure the pool cart to the vehicle hitch. Embodiments are shown having a coil type return spring and one or more torsion type return springs.

20 Claims, 3 Drawing Sheets

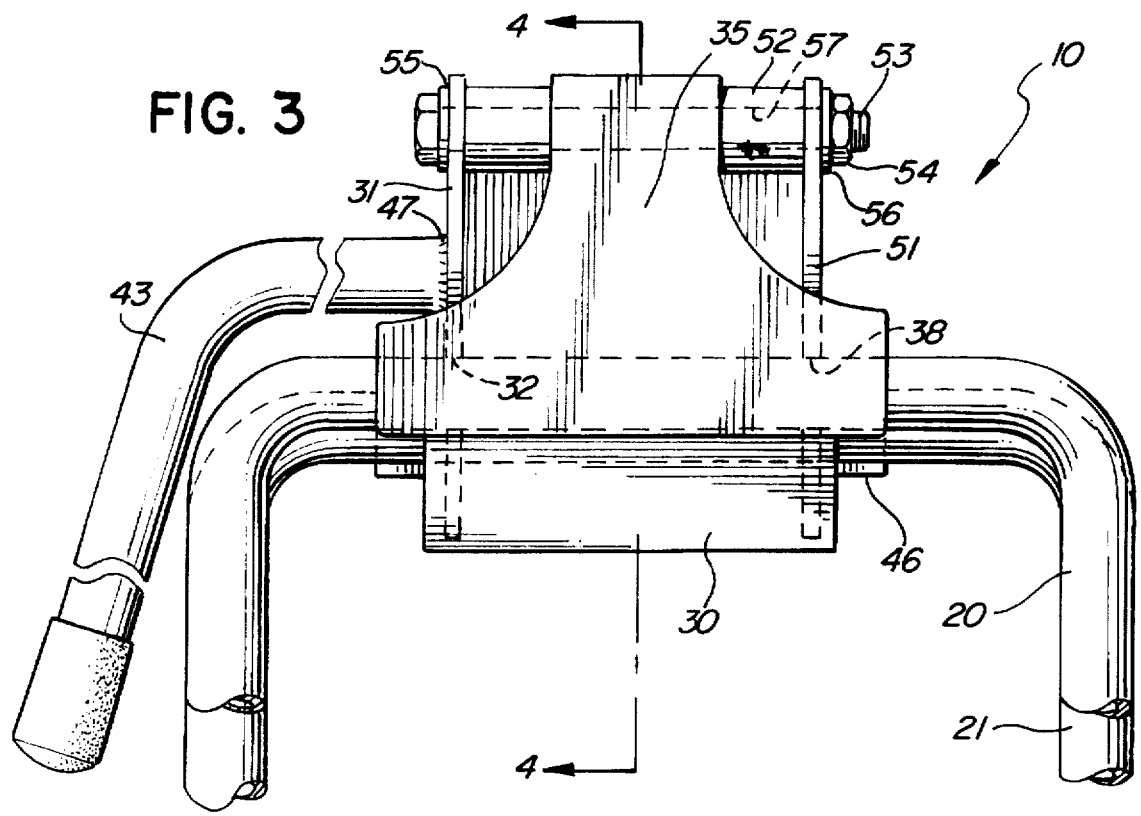
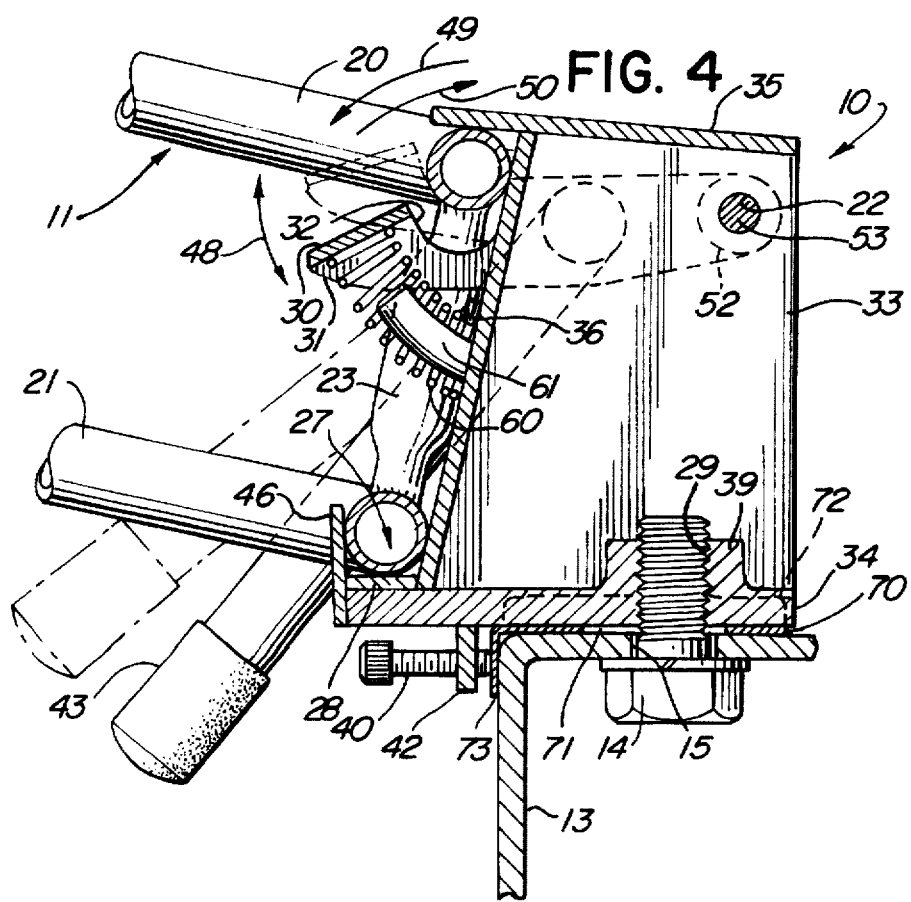

VEHICLE HITCH FOR SECURING A HAND TRUCK, CART OR OTHER SMALL LOAD

SPECIFICATION

1. Field of the Invention

This invention relates generally to vehicle hitches and particularly to those utilized in securing a hand truck, cart or other small load to a convenient vehicle surface such as a bumper or the like.

2. Background of the Invention

In carrying forward various service businesses and occupations, a need often arises to utilize a hand truck or cart in conjunction with a service vehicle for transporting various loads to and from the vehicle. For purposes of convenience, such hand trucks or carts are often carried in relatively small vehicles such as light trucks or pick-up trucks. The advantages of such hand trucks or carts are numerous. For example, the use of such carts is convenient and relatively easy to master. Such hand trucks or carts are generally small and for the loads which they are able to carry are relatively lightweight and inexpensive. The hand trucks or carts typically employed are also capable of movement through relatively small travel areas.

One service business which relies heavily upon the use of such hand trucks or carts is the business of swimming pool and spa servicing. In the pool and spa servicing businesses, a hand truck usually referred to as a pool cart is specifically designed to carry the various equipment and chemicals needed in servicing a swimming pool or spa. While swimming pool service personnel could carry such pool carts within the truck bed of a pick-up truck, the most common practice is to utilize a vehicle hitch for securing the pool cart to the vehicle rear bumper. In most types of pool cart hitches, the pool cart is supported at the rear of the vehicle in a generally vertical orientation leaving room in the truck bed for transporting other materials such as chemicals and equipment. For safety reasons, the hitch utilized in securing the pool cart to the vehicle bumper must securely hold the pool cart and resist the various jostling and jarring forces imparted to the hitch. In addition, the preferred design of such pool cart hitches attempts to minimize the labor and difficulty of attaching and removing the pool cart. It is also preferable that the pool cart hitch be secured to the vehicle with a minimum of modification or alteration of the vehicle itself.

In attempting to meet the need for reliable, safe and convenient pool cart hitches, practitioners in the art have provided a variety of hitch designs. For example, U.S. Pat. No. 5,489,112 issued to Warrington, et al. sets forth a HITCH MOUNT having a base member securable to a vehicle bumper which supports a fixed lower jaw and a movable upper jaw. The movable upper jaw is supported in a pivotal attachment to a vertical support column and a pair of inwardly oriented receiving channels are provided in the fixed lower jaw and movable upper jaw. A coil spring is secured between the fixed and movable jaws to provide a closing force for securing the pool cart within the channels of the jaws. A separate lock mechanism including a sliding bolt is supported upon the vertical column to prevent opening of the movable jaw during transport of the cart secured therein. A handle is fixedly secured to the upper jaw and is utilized in pivoting the upper jaw upwardly away from the lower jaw overcoming the spring force to release the pool cart.

While pool cart hitches such as the above-described hitch have, to some extent, improved the art and may enjoy some commercial success, they remain subject to several significant limitations and shortcomings. For example, the structure set forth in Warrington, et al. is relatively complex and expensive to manufacture. In addition, the spring-biased upper jaw is susceptible to opening during transport as jostling forces upon the cart are imparted to the pivotable arm and may overcome the spring force. As a result, an additional positive lock bolt is required for safety purposes. Further, the upward handle motion required to open or release the hitch is inconvenient and difficult and leaves the operator trying to manipulate the released pool cart with one hand. The structure of the Warrington, et al. hitch tends to be tall and restricts tailgate motion if used on the rear bumper of a pick-up truck. The substantially horizontal extension of the handle used in the Warrington hitch protrudes rearward significantly causing obstructions to the work area. Finally, the upper portion of the hitch is replete with protrusions of the lock mechanism which tend to damage the tailgate of a pick-up truck which may be partially opened and rested upon the hitch structure.

In view of the foregoing limitations typical of prior art pool cart hitches, there remains a continuing need in the art for further improved vehicle hitches for use in applications such as pool cart hitches which overcome the various limitations and disadvantages of the prior art devices.

SUMMARY OF THE INVENTION

Accordingly, it is a general object of the present invention to provide an improved vehicle hitch for securing a hand truck, cart or other small load. It is a more particular object of the present invention to provide an improved vehicle hitch for securing a hand truck or cart which is less complex and less expensive than prior art devices. It is a still more particular object of the present invention to provide an improved vehicle hitch for securing a hand truck or cart which securely attaches a pool cart or the like and maintains the attachment during transport without the need of additional lock apparatus. It is a still more particular object of the present invention to provide an improved vehicle hitch for securing a hand truck or cart which may be operated in a foot release operation leaving the use of two hands for the operator in handling the released cart.

In accordance with the present invention, there is provided for use in securing a cart having an upper tube and a spaced-apart lower tube, a vehicle hitch comprising: a base plate having means for attachment to a vehicle; a vertical support secured to the base plate; a top plate secured to the vertical support above the base plate; an angled front plate extending between the top plate and the base plate; a saddle plate secured to the base plate and spaced from the front plate to form a lower channel between the saddle plate and the front plate; a pair of latch arms each pivotally secured to the vertical support and each defining an upwardly open notch therein, the latch arms pivotable between a lock position and an open position; a cam plate joined to the pair of latch arms; and spring means coupled to the latch arms for urging the arms toward the locked position.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 3 sets forth a top view of a vehicle hitch constructed in accordance with the present invention;

FIG. 4 sets forth a section view of the present invention vehicle hitch taken along section lines 4—4 in FIG. 3;

DESCRIPTION OF THE PREFERRED EMBODIMENTS

Figure 1:
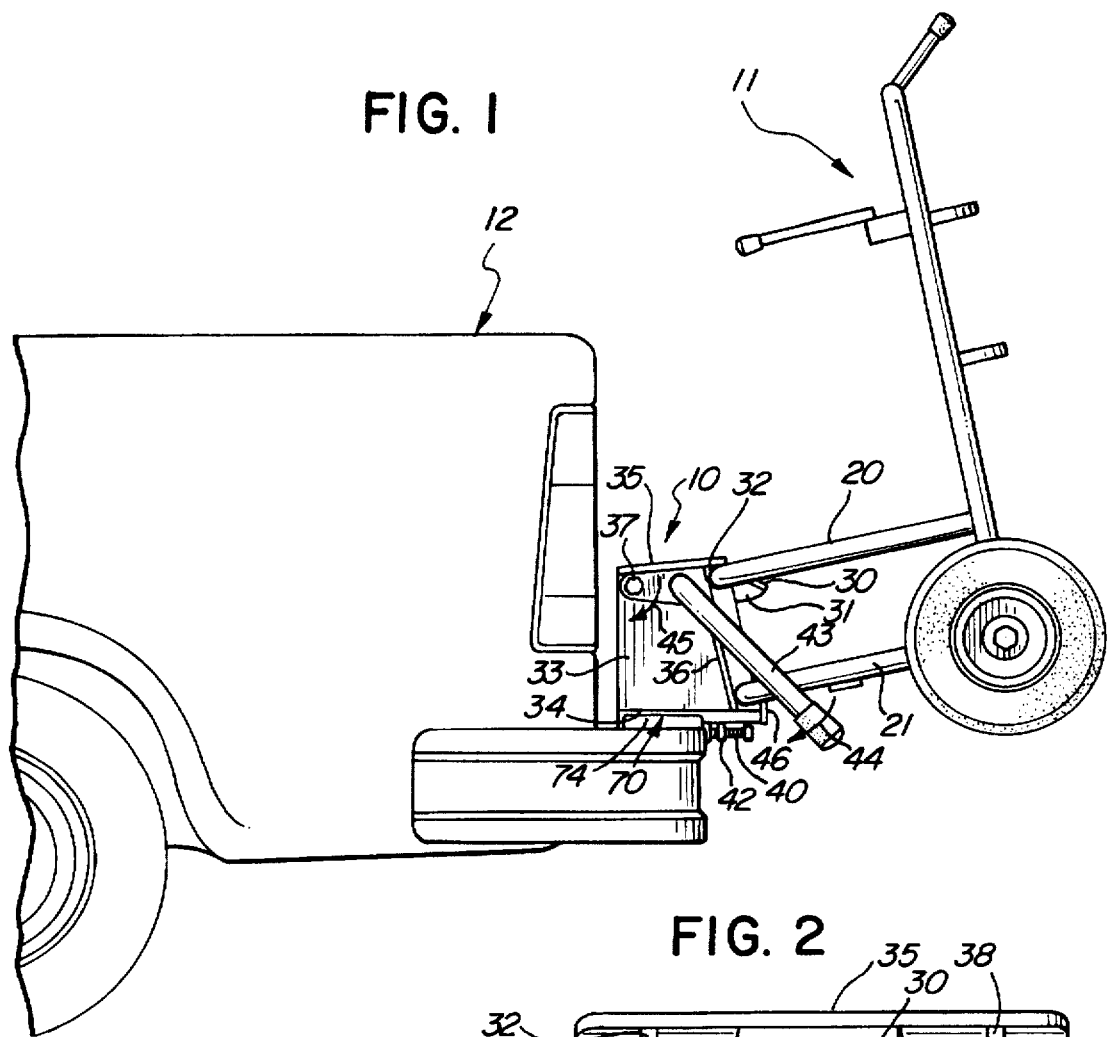
FIG. 1 sets forth a side view of a vehicle hitch constructed in accordance with the present invention secured to a rear bumper of a typical pick-up truck and supporting a typical pool cart.

FIG. 1 sets forth a side elevation view of a pool cart hitch constructed in accordance with the present invention and generally referenced by numeral 10. Also shown in FIG. 1 is a rear portion of a conventional pick-up truck 12 having a rear bumper 13 also of conventional construction. Further shown in FIG. 1 is a conventional pool cart 11 secured to cart hitch 10 in accordance with the present invention. Pool cart 11 is formed of conventional tubular steel construction and includes an upper tube 20 and a lower tube 21 spaced apart to form a lower receptacle for chemicals, equipment and other apparatus normally carried by pool service personnel.

Figure 2:
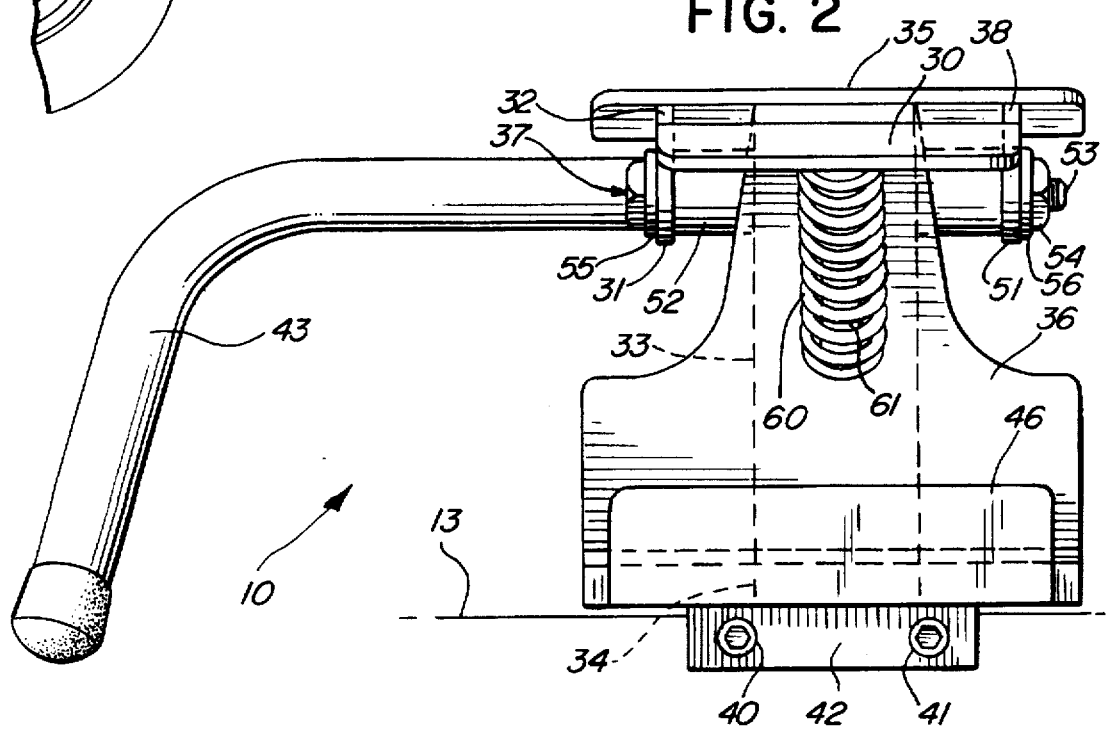
FIG. 2 sets forth a rear view of the present invention vehicle hitch.

In accordance with the present invention, hitch 10 includes a base plate 34 resting upon the upper surface of bumper 13 and secured thereto in the manner shown in FIG. 4. Base plate 34 supports a bolt plate 42 extending downwardly from the undersurface thereof which supports a bolt 40 and a bolt 41 (the latter seen in FIG. 2). A twist plate 70 better seen in FIG. 4 is interposed between bumper 13 and base plate 34 of hitch 10. A vertical support 33 formed of a rectangular box-like structure is secured to base plate 34 and extends upwardly therefrom. A generally planar top plate 35 is supported upon the upper edge of support 33 and secured thereto. The attachment of vertical support 33 to base plate 34 and top plate 35 is preferably achieved by conventional welding attachment. A front plate 36 is angularly disposed between top plate 35 and base plate 34 and is secured to plates 34 and 35 as well as vertical support 33 using conventional welding attachment. A saddle plate 46, better seen in FIG. 2, is secured to the outer end of base plate 34. Saddle plate 46 and the lower end of front plate 36 form a channel therebetween which receives lower tube 21 of pool cart 11 as the lower attachment of cart 11 to hitch 10.

Hitch 10 further includes a pair of latch arms 31 and 51 (the latter seen in FIG. 2) which are pivotally supported upon base plate 34 at a pivotal attachment 37. Latch arm 31 defines a notch 32 which, in the closed position shown in FIG. 1, receives and engages a portion of upper tube 20 of pool cart 11. As is better seen in FIG. 2, hitch 10 further includes a latch arm 51 oppositely positioned from latch arm 31 which defines a corresponding notch 38 which also receives and engages upper tube 20 of pool cart 11. An angularly disposed cam plate 30 extends between and is secured to the outer ends of latch arms 31 and 51. A handle 43 is secured to latch arm 31 in a fixed attachment preferably using a conventional welding attachment such that handle 43 may be moved by the operator causing a corresponding movement of latch arms 31 and 51 (as is seen in FIG. 2).

In the position shown in FIG. 1, hitch 10 has received and fully engages lower tube 21 and upper tube 20 of pool cart 11 and has assumed the closed or latched position. When so positioned, latch 10 fully captivates pool cart 11 and the user is able to drive pick-up truck 12 relying upon hitch 10 to securely maintain pool cart 11 in attachment to bumper 13. In accordance with an important aspect of the present invention set forth below in greater detail, the user is able to easily release pool cart 11 from hitch 10 by simply pivoting handle 43 downwardly in the direction indicated by arrow 44 thereby overcoming the spring closure force of spring 60 (seen in FIG. 2). As the retaining spring force of hitch 10 is overcome and handle 43 pivots downwardly in the direction indicated by arrow 44, latch arms 31 and 51 (the latter seen in FIG. 2) are correspondingly pivoted about pivot 37 in the direction indicated by arrow 45. As is more clearly shown in FIG. 4, the angular motion of latch arms 31 and 51 about pivot 37 release the captivation of upper tube 20 of pool cart 11 allowing pool cart 11 to be pivoted downwardly freeing upper tube 20 from hitch 10 afterwhich pool cart 11 is easily withdrawn from hitch 10. In accordance with an important aspect of the present invention, handle 43 is angled downwardly and is of sufficient length to facilitate opening or releasing hitch 10 using either hand force upon handle 43 or, preferably, by the user placing a foot upon the lower portion of handle 43 and pivoting handle 43 under foot pressure. In this manner, the user then has both hands free to manipulate pool cart 11. It will be apparent to those skilled in the art that the structure by which the present invention pool cart hitch facilitates release through downward motion of handle 43 is a substantial improvement over the prior art devices which have required upward pivotal movement of the release handle. In addition and as is set forth below in greater detail, the present invention pool cart hitch is advantageous in that the pool cart is securely locked within the cart hitch without the need of additional locking apparatus due to the novel structure by which latch arms 31 and 51 resist gravitational and jostling forces upon pool cart 11. It should also be noted that the flat structure of top plate 35 and the minimal height of cart hitch 10 cooperate to facilitate at least partial opening of the tailgate (not shown) of pick-up truck 12. In further accordance with the present invention and as is further described below in greater detail, the angular position of cam plate 30 supported by latch arms 31 and 51 (seen in FIG. 2) facilitate a snap-in attachment operation by which pool cart 11 may be easily secured to hitch 10. In essence, the user simply approaches hitch 10 with pool cart 11 and deposits lower tube 21 behind saddle plate 46 and thereafter simply pivots pool cart 11 upwardly forcing upper tube 20 against cam plate 30. The force exerted upon cam plate 30 overcomes the retention of spring 60 and causes latch plates 31 and 51 to be forced downwardly and allowing upper tube 20 to pivot into notches 32 and 38 of latch arms 31 and 51. Once upper tube 20 is received within notches 32 and 38, the spring force within hitch 10 operates to pivot latch arms 31 and 51 upwardly to the closed position shown in FIG. 1 whereby pool cart 11 is again secured within hitch 10.

FIG. 2 sets forth a rear view of hitch 10 resting upon a portion of bumper 13. As described above, hitch 10 includes a base plate 34 supporting a plate 42 which in turn supports bolts 40 and 41 against bumper 13. A vertical support 33 is secured to base plate 34 and extends upwardly to support a generally planar top plate 35. A pivot cylinder 52 extends through a pair of apertures within base plate 34 and as is better seen in FIG. 3 defines a pivot bore 57. Hitch 10 further includes an angularly disposed front plate 36 extending between top plate 35 and base plate 34. A saddle plate 46 is secured to the frontal edge of base plate 34 and is spaced from front plate 36 to form a channel between saddle plate 46 and the lower end of front plate 36 which receives lower tube 21 of pool cart 11 (seen in FIG. 1).

A pair of latch arms 31 and 51 are pivotally supported upon pivot cylinder 52 by a pivot bolt 53 extending through apertures formed in latch arms 31 and 51 and pivot bore 57 of cylinder 52. Pivot bolt 53 further supports a pair of conventional washers 55 and 56 and is secured within pivot cylinder 52 by a conventional threaded fastener 54. The combination of pivot cylinder 52, pivot bolt 53, washers 55 and 56 and fastener 54 cooperate to form pivot 37 which, as described above, provides pivotal attachment of latch arms 31 and 51 to vertical support 33. An angularly disposed cam plate 30 is secured to the forward edges of latch arms 31 and 51. In addition, latch arms 31 and 51 define corresponding notches 32 and 38 respectively.

In the operation of the present invention vehicle hitch, the combined structure formed by latch arms 31 and 51 together with cam plate 30 is urged upwardly about pivot 37 to provide hitch closure by an appropriate return spring mechanism. In the embodiment shown in FIGS. 2, 3 and 4, this return spring function is provided by the combination of coil spring 60 and spring guide 61. By way of alternative, a torsion spring or pair of torsion springs may be correspondingly utilized in place of spring 60 and spring guide 61 in the manner shown in the alternate embodiment of FIGS. 5 and 6. It will be apparent to those skilled in the art, however, that such return spring mechanisms are meant to be illustrative of the basic function of return spring action and thus the present invention system is not limited to the use of any specific return spring apparatus. The important aspect with respect to the present invention of the return spring mechanism is the biasing or urging of latch arms 31 and 51 together with cam plate 30 toward the raised position shown in FIG. 2.

In further accordance with the present invention, the angular position of cam plate 30 facilitates the above-described snap-in attachment of pool cart 11 (shown in FIG. 1). As can be seen, the force exerted upon cam plate 30 by the upper tube of a pool cart is converted due to the angular position of cam plate 30 to a torsional force about pivot 37 exerted upon latch arms 31 and 51 as the force of spring 60 is overcome.

In further accordance with the present invention, handle 43 extends downwardly at an appropriate angle to facilitate operation using either hand or foot pressure. The torsional force applied as handle 43 is forced downwardly is directly coupled to latch arm 31 due to the attachment of handle 43 thereto. Further, this torsional force is coupled by cam plate 30 to latch arm 51 causing a corresponding downward torsional force against latch arm 51 and providing release of hitch 10.

Bolts 40 and 41 are tightened as needed to impart a stabilizing action against bumper 13 facilitating greater resistance to twisting forces exerted upon hitch 10.

FIG. 3 sets forth a top view of hitch 10 having upper tube 20 and lower tube 21 of pool cart 11 received and locked therein. As described above, hitch 10 includes a vertical support 33 (seen in FIG. 4) which in turn supports a transversely extending pivot cylinder 52 having a bore 57 extending therethrough. The combined assembly of a pair of latch arms 31 and 51 together with an angularly disposed cam plate 30 are pivotally secured to pivot cylinder 52 by a pivot bolt 53 extending through apertures formed at the pivot end of latch arms 31 and 51. A pair of washers 55 and 56 are interposed between the head of bolt 53 and threaded nut 54 respectively. The latter is threadably received upon the end of pivot bolt 53 and tightened to a suitable tension to maintain the pivotal attachment of latch arms 31 and 51. Vertical support 33 (seen in FIG. 4) further supports a top plate 35 which narrows at its forward end and expands outwardly to its full width at the rearward end proximate cam plate 30. Latch arms 31 and 51 describe respective notches 32 and 38 (better seen in FIG. 4). Hitch 10 further includes a saddle plate 46 at the lower portion thereof. Lower tube 21 of pool cart 11 is received behind saddle plate 46 in the manner shown in FIG. 4 while upper tube 20 is captivated within notches 32 and 38 against the undersurface of top plate 35. An elongated downwardly angled handle 43 is joined to latch arm 31 by a conventional weld attachment 47. In its preferred form, handle 43 is angled downwardly and is of sufficient length to facilitate the downward pivoting thereof in response to foot pressure or hand pressure by the user. It will be apparent from examination of FIG. 3 that the present invention vehicle hitch is fabricated using a relatively simple, rugged and sturdy construction having a minimum of parts when compared to the prior art devices such as the above-described prior art vehicle hitch.

FIG. 4 sets forth a section view of the present invention vehicle hitch taken along section lines 4—4 in FIG. 3. As described above, hitch 10 includes a base plate 34 and a vertically extending rectangular vertical support 33. Vertical support 33 in turn supports a top plate 35. A front plate 36 is secured to the underside of top plate 33 and to vertical support 33. Front plate 36 is slightly angled between top plate 35 and base plate 34. In addition, front plate 36 defines a channel extension 28 preferably formed by bending the lower portion of front plate 36 which is secured to base plate 34 using conventional welding attachment or the like. A saddle plate 46 is secured to the end portion of base plate 34 and is further joined to channel extension 28 of front plate 36 again using conventional welding attachments or the like.

Base plate 34 further defines a cylindrical boss 39 extending upwardly from the upper surface of base plate 34. A threaded aperture 29 extends through boss 39 and the underlying portion of base plate 34. A twist plate 70 defines a generally U-shaped cross-section and is slidably received upon base plate 34. Twist plate 70 defines a slot 71 and a downwardly extending tab 73. The U-shaped cross-section of twist plate 70 provides upwardly extending guides 74 and 72 (the former seen in FIG. 1) which captivate the outer edges of base plate 34. A plate 42 is joined to the undersurface of base plate 34 and supports a pair of bolts 40 and 41 (the latter seen in FIG. 2). Bolts 40 and 41 cooperate with twist plate 70 to enable hitch 10 to better resist twisting forces in its attachment to bumper 13.

Bumper 13 defines an aperture 15 which receives bolt 14 for attachment of base plate 34 to the upper surface of bumper 13. As described, bolts 40 and 41 are tightened against tab 73 of twist plate 70 to complete the installation of hitch 10 upon bumper 13.

In accordance with an important aspect of the present invention, a pair of latch arms 31 and 51 (the latter seen in FIG. 3) are pivotally supported upon pivot cylinder 52 by pivot bolt 53. It will be apparent to those skilled in the art that pivot cylinder 52 may be fabricated either as a single continuous cylinder extending through appropriate apertures formed in the side walls of vertical support 33 or, alternatively, may comprise opposing cylinder portions which are joined to the side walls of vertical support 33 using welding attachment or the like. In either event, pivot bolt 53 preferably extends through a suitable aperture such as aperture 22 shown in FIG. 4 to provide the above-described pivotal attachment of latch arms 31 and 51. It will be understood by those skilled in the art that latch arms 31 and 51 are identical and thus the depiction of latch arm 31 shown in FIG. 4 should be understood to apply equally well and be equally descriptive of latch arm 51 shown in FIG. 3. The important aspect with respect to the present invention is the pivotal attachment of latch arms 31 and 51 to pivot cylinder 52 and the attachment of the outer ends of each latch arm to angularly disposed cam plate 30. The combined structure of latch arms 31 and 51 together with cam plate 30 are thus pivotable about pivot bolt 53. As is also described above, latch arms 31 and 51 define respective notches 32 and 38. In the drawing of FIG. 4, latch arm 31 and cam plate 30 are shown in the open or release position in solid-line representation and are shown in the raised or locked position in dashed-line representation. The different positions of latch arms 31 and 51 are obtained by pivoting handle 43 secured to latch arm 31 in the manner described above.

The proper operation of the present invention hitch requires a suitable return spring mechanism operative upon latch arms 31 and 51 for urging latch arms 31 and 51 together with cam plate 30 upwardly to the locked position shown in dashed-line representation. In the embodiment of FIG. 4, a coil spring 60 is supported upon a spring guide 61 extending from front plate 36. The remaining end of spring 60 is secured to the undersurface of cam plate 30 using conventional fabrication such as a weld attachment or the like. The function of spring 60 is to provide a return spring force which urges latch arms 31 and 51 together with cam plate 30 upwardly to the locked position.

In operation, the user releases hitch 10 by pivoting handle 43 downwardly causing latch arms 31 and 51 to pivot correspondingly about pivot bolt 53 and thereby releasing upper tube 20 from notches 32 and 38. Conversely, with handle 43 released, the force of spring 60 pivots latch arms 31 and 51 upwardly to the locked dashed-line position shown in FIG. 4 captivating upper tube 20 within notches 32 and 38 against the undersurface of top plate 35. In accordance with an important aspect of the present invention, the locked position of hitch 10 is retained by the captivation of notches 32 and 38 upon upper tube 20 and the captivation of lower tube 21 within lower channel 27. As a result, the force of spring 60 is utilized solely to maintain the raised position of latch arms 31 and 51 and does not need to directly resist the jostling forces upon pool cart 11. These jostling forces are taken up by notches 32 and 38 in latch arms 31 and 51 (the latter seen in FIG. 3) together with lower channel 27. As a result, the force of spring 60 may be substantially lighter than the spring force in prior art devices in which the mechanism for locking requires the spring force to resist jostling forces. Further, since a positive lock is achieved in the present invention structure which resists jostling forces as the vehicle is moved, the supplemental or additional locking apparatus utilized in the prior art devices is no longer necessary. The captivation of upper tube 20 against top plate 35 within notches 32 and 38 together with the captivation of lower tube 21 within lower channel 27 fully secures the pool cart.

The installation of pool cart 11 within hitch 10 is easily achieved by the user in simply pivoting the pool cart such that lower tube 21 may be received within lower channel 27 and the cart angled toward the user such that upper tube 20 is substantially aligned with cam plate 30. Thereafter, the user simply pivots pool cart 11 in the direction indicated by arrow 50 forcing upper tube 20 against cam plate 30. The angular position of cam plate 30 translates this force into a downward pivoting force overcoming the force of spring 60 and displacing latch arm 31 downwardly allowing upper tube 20 to pivot into the position shown in FIG. 4 against front plate 36 and beneath top plate 35. Thereafter, once upper tube 20 clears cam plate 30, return spring 60 pivots cam plate 30 and latch arms 31 and 51 upwardly to the locked dashed-line position shown captivating pool cart 11 within hitch 10.

The removal of pool cart 11 is carried forward in the reverse manner by initially pivoting handle 43 downwardly from the dashed-line closed position to the solid-line open position causing latch arms 31 and 51 to be pivoted to the open position shown. Thereafter, the user simply allows cart 11 to pivot about lower tube 21 within lower channel 27 in the direction indicated by arrow 49 withdrawing upper tube 20 from the hitch. This manipulation of handle 43 may be carried forward using a foot pressure upon handle 43 leaving the user with both hands free to support cart 11. Once handle 43 is released, it returns to the closed position and the user then is able to simply lift lower tube 21 from lower channel 27 completing the withdrawal of pool cart 11 from hitch 10.

Figure 5:
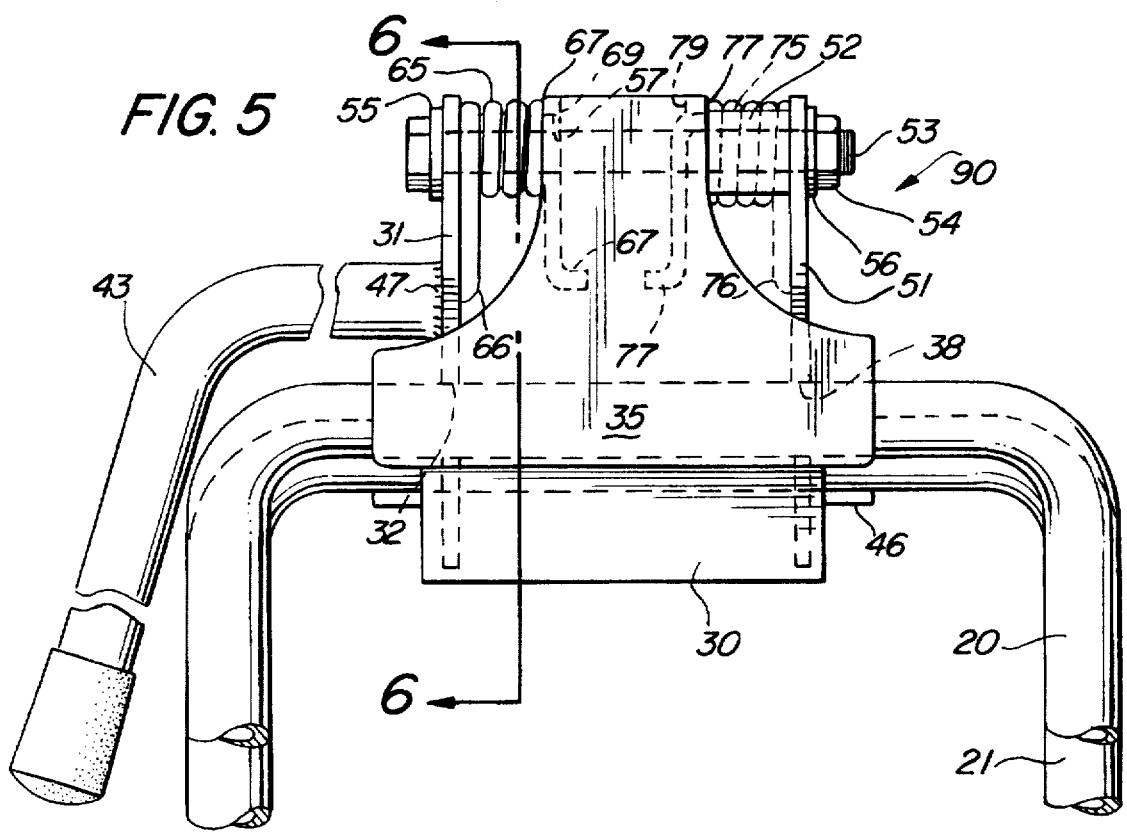
FIG. 5 sets forth a top view of an alternate embodiment of the present invention vehicle hitch.
Figure 6:
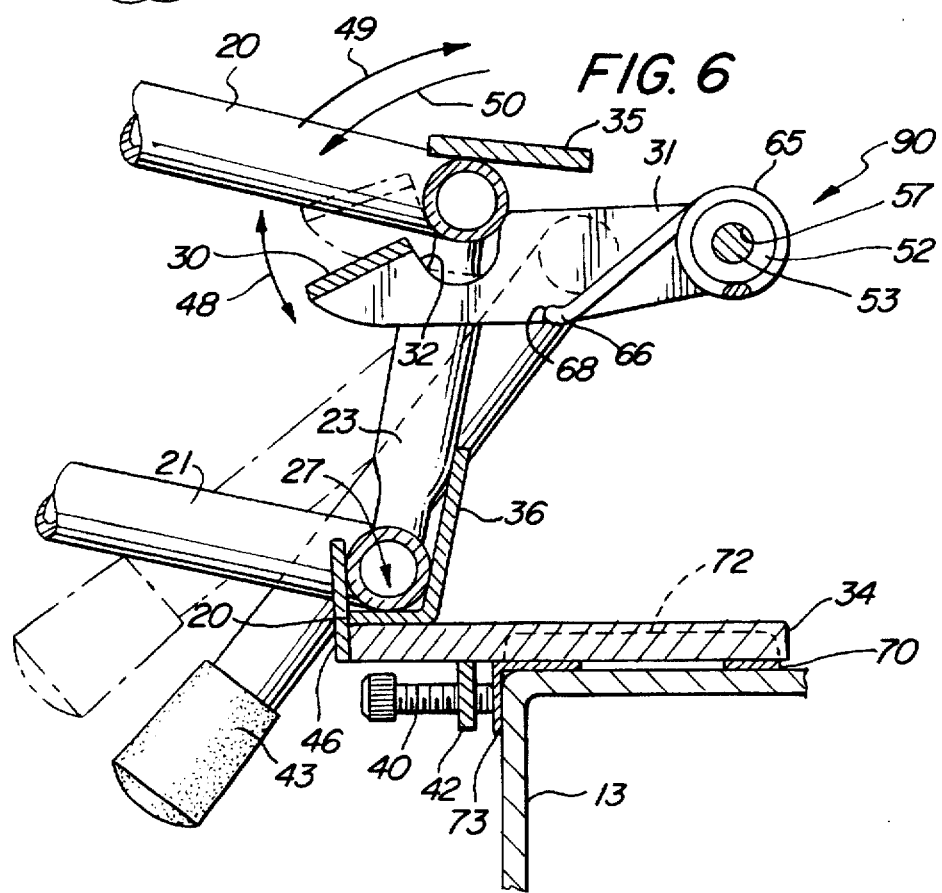
FIG. 6 sets forth a section view of the alternate embodiment of the present invention vehicle hitch shown in FIG. 5 taken along section lines 6—6 therein.

FIGS. 5 and 6 show respective top and section views of an alternate embodiment of the present invention vehicle hitch. It will be apparent to those skilled in the art from examination of FIGS. 5 and 6 and comparison thereof to FIGS. 3 and 4 that the sole difference between the embodiments of FIGS. 5 and 6 is the utilization of a torsion type return spring in place of spring 60 in the embodiment of FIGS. 3 and 4. For further illustration, FIG. 5 shows an optional second torsion spring positioned upon the opposite side of hitch 10 in dashed-line representation. In either event, the sole difference between the embodiments of FIGS. 5 and 6 and the embodiment set forth in FIGS. 3 and 4 is found in the substitution of a torsion spring or pair of torsion springs as alternatives to coil spring 60. Thus, it will be understood that the descriptions of structure and operation set forth above in FIGS. 1 through 4 apart from those relating to the structure of spring 60 apply equally well and are equally descriptive of the embodiment shown in FIGS. 5 and 6.

More specifically, FIG. 5 sets forth a top view of hitch 90 having upper tube 20 and lower tube 21 of pool cart 11 received and locked therein. As described above, hitch 90 includes a vertical support 33 (seen in FIG. 4) which in turn supports a transversely extending pivot cylinder 52 having a bore 57 extending therethrough. The combined assembly of a pair of latch arms 31 and 51 together with an angularly disposed cam plate 30 are pivotally secured to pivot cylinder 52 by a pivot bolt 53 extending through apertures formed at the pivot end of latch arms 31 and 51. A pair of washers 55 and 56 are interposed between the head of bolt 53 and threaded nut 54 respectively. The latter is threadably received upon the end of pivot bolt 53 and tightened to a suitable tension to maintain the pivotal attachment of latch arms 31 and 51. Vertical support 33 (seen in FIG. 4) further supports a top plate 35 which narrows at its forward end and expands outwardly to its full width at the rearward end proximate cam plate 30. Latch arms 31 and 51 describe respective notches 32 and 38 (better seen in FIG. 6). Hitch 90 further includes a saddle plate 46 at the lower portion thereof. Lower tube 21 of pool cart 11 is received behind saddle plate 46 in the manner shown in FIG. 6 while upper tube 20 is captivated within notches 32 and 38 against the undersurface of top plate 35. An elongated downwardly angled handle 43 is joined to latch arm 31 by a conventional weld attachment 47. In its preferred form, handle 43 is angled downwardly and is of sufficient length to facilitate the downward pivoting thereof in response to foot pressure or hand pressure by the user. It will be apparent from examination of FIG. 5 that the present invention vehicle hitch is fabricated using a relatively simple, rugged and sturdy construction having a minimum of parts when compared to the prior art devices such as the above-described prior art vehicle hitch.

A torsion spring 65 is received upon pivot cylinder 52 and includes an end 66, which as is better seen in FIG. 6, is received within a notch 68 formed in arm 31. Torsion spring 65 further includes an end 67 which is held in a fixed attachment to vertical support 33 or, alternatively, to top plate 35. As a result, a torsion spring force is applied to arm 31 urging it upwardly. This torsion spring force is also coupled to arm 51 via cam plate 30. However, it has been found preferable to utilize a second torsion spring 75, shown in dashed-line representation. Torsion spring 75 includes an end 76 received in a notch 78 formed in arm 51. Torsion spring 75 also includes a fixed end 77 which is fixed to either vertical support 33 or top plate 35. Torsion spring 75 provides a spring force upon arm 51 urging it upwardly.

FIG. 6 sets forth a section view of the present invention vehicle hitch taken along section lines 6—6 in FIG. 5. As described above, hitch 90 includes a base plate 34 and a vertically extending rectangular vertical support 33 (seen in FIG. 4). Vertical support 33 in turn supports a top plate 35. A front plate 36 is secured to the underside of top plate 35 and to vertical support 33. Front plate 36 is slightly angled between top plate 35 and base plate 34. In addition, front plate 36 defines a channel extension 28 preferably formed by bending the lower portion of front plate 36 which is secured to base plate 34 using conventional welding attachment or the like. A saddle plate 46 is secured to the end portion of base plate 34 and is further joined to channel extension 28 of front plate 36 again using conventional welding attachments or the like.

Base plate 34 further defines a cylindrical boss 39 extending upwardly from the upper surface of base plate 34. With temporary reference to FIG. 4, a threaded aperture 29 extends through boss 39 and the underlying portion of base plate 34. A twist plate 70 defines a generally U-shaped cross-section and is slidably received upon base plate 34. Twist plate 70 defines a slot 71 and a downwardly extending tab 73. The U-shaped cross-section of twist plate 70 provides upwardly extending guides 74 and 72 (the former seen in FIG. 1) which captivate the outer edges of base plate 34. A plate 42 is joined to the undersurface of base plate 34 and supports a pair of bolts 40 and 41 (the latter seen in FIG. 2). Bolts 40 and 41 cooperate with twist plate 70 to enable hitch 90 to better resist twisting forces in its attachment to bumper 13.

Bumper 13 defines an aperture 15 which receives bolt 14 for attachment of base plate 34 to the upper surface of bumper 13. As described, bolts 40 and 41 are tightened against tab 73 of twist plate 70 to complete the installation of hitch 90 upon bumper 13.

Returning to FIG. 6, and in accordance with an important aspect of the present invention, a pair of latch arms 31 and 51 (the latter seen in FIG. 5) are pivotally supported upon pivot cylinder 52 by pivot bolt 53. It will be apparent to those skilled in the art that pivot cylinder 52 may be fabricated either as a single continuous cylinder extending through appropriate apertures formed in the side walls of vertical support 33 or, alternatively, may comprise opposing cylinder portions which are joined to the side walls of vertical support 33 using welding attachment or the like. In either event, pivot bolt 53 preferably extends through a suitable aperture such as aperture 22 shown in FIG. 4 to provide the above-described pivotal attachment of latch arms 31 and 51. It will be understood by those skilled in the art that latch arms 31 and 51 are identical and thus the depiction of latch arm 31 shown in FIG. 6 should be understood to apply equally well and be equally descriptive of latch arm 51 shown in FIG. 5. The important aspect with respect to the present invention is the pivotal attachment of latch arms 31 and 51 to pivot cylinder 52 and the attachment of the outer ends of each latch arm to angularly disposed cam plate 30. The combined structure of latch arms 31 and 51 together with cam plate 30 are thus pivotable about pivot bolt 53. As is also described above, latch arms 31 and 51 define respective notches 32 and 38. In the drawing of FIG. 6, latch arm 31 and cam plate 30 are shown in the open or release position in solid-line representation and are shown in the raised or locked position in dashed-line representation. The different positions of latch arms 31 and 51 are obtained by pivoting handle 43 secured to latch arm 31 in the manner described above.

The proper operation of the present invention hitch requires a suitable return spring mechanism operative upon latch arms 31 and 51 for urging latch arms 31 and 51 together with cam plate 30 upwardly to the locked position shown in dashed-line representation. In the embodiment of FIG. 6, torsion spring 65 encircles pivot cylinder 52 and provides this function. Also, torsion spring 75 (shown in dashed-line in FIG. 5) provides a further return spring force. As a result, either spring 65 alone or springs 65 and 75 together function to create a return spring force which urges latch arms 31 and 51 together with cam plate 30 upwardly to the locked position.

In operation, the user releases hitch 90 by pivoting handle 43 downwardly causing latch arms 31 and 51 to pivot correspondingly about pivot bolt 53 and thereby releasing upper tube 20 from notches 32 and 38. Conversely, with handle 43 released, the force of spring 65 (or springs 65 and 75) pivots latch arms 31 and 51 upwardly to the locked dashed-line position shown in FIG. 6 captivating upper tube 20 within notches 32 and 38 against the undersurface of top plate 35. In accordance with an important aspect of the present invention, the locked position of hitch 90 is retained by the captivation of notches 32 and 38 upon upper tube 20 and the captivation of lower tube 21 within lower channel 27. As a result, the force of spring 65 (or springs 65 and 75) is utilized solely to maintain the raised position of latch arms 31 and 51 and does not need to directly resist the jostling forces upon pool cart 11. These jostling forces are taken up by notches 32 and 38 in latch arms 31 and 51 (the latter seen in FIG. 5) together with lower channel 27. As a result, the force of spring 65 (or springs 65 and 75) may be substantially lighter than the spring force in prior art devices in which the mechanism for locking requires the spring force to resist jostling forces. Further, since a positive lock is achieved in the present invention structure which resists jostling forces as the vehicle is moved, the supplemental or additional locking apparatus utilized in the prior art devices is no longer necessary. The captivation of upper tube 20 against top plate 35 within notches 32 and 38 together with the captivation of lower tube 21 within lower channel 27 fully secures the pool cart.

The installation of pool cart 11 within hitch 90 is easily achieved by the user in simply pivoting the pool cart such that lower tube 21 may be received within lower channel 27 and the cart angled toward the user such that upper tube 20 is substantially aligned with cam plate 30. Thereafter, the user simply pivots pool cart 11 in the direction indicated by arrow 50 forcing upper tube 20 against cam plate 30. The angular position of cam plate 30 translates this force into a downward pivoting force overcoming the force of spring 65 (or springs 65 and 75) and displacing latch arm 31 downwardly allowing upper tube 20 to pivot into the position shown in FIG. 6 against front plate 36 and beneath top plate 35. Thereafter, once upper tube 20 clears cam plate 30, the return spring force pivots cam plate 30 and latch arms 31 and 51 upwardly to the locked dashed-line position shown captivating pool cart 11 within hitch 90.

The removal of pool cart 11 is carried forward in the reverse manner by initially pivoting handle 43 downwardly from the dashed-line closed position to the solid-line open position causing latch arms 31 and 51 to be pivoted to the open position shown. Thereafter, the user simply allows cart 11 to pivot about lower tube 21 within lower channel 27 in the direction indicated by arrow 49 withdrawing upper tube 20 from the hitch. This manipulation of handle 43 may be carried forward using a foot pressure upon handle 43 leaving the user with both hands free to support cart 11. Once handle 43 is released, it returns to the closed position and the user then is able to simply lift lower tube 21 from lower channel 27 completing the withdrawal of pool cart 11 from hitch 90.

What has been shown is a novel vehicle hitch for securing a hand truck or cart which is particularly well suited to transporting a pool service cart upon the rear bumper of a pick-up truck or the like. The vehicle hitch shown is, of course, equally applicable and usable in transporting other carts upon other vehicles while enjoying the advantages of the present invention. The inventive structure enjoys several advantages over the prior art which include the use of a long downwardly extending handle which is movable downwardly to open the vehicle hitch is equally accessible for use in either foot pedal or hand activation representing a substantial improvement over the prior art devices which require upward motion for opening. The latching mechanism provided is superior to the prior art devices in its ability to positively lock the pool cart and resist jostling forces without the need of an additional lock mechanism. The hitch also has fewer parts and is of substantially more simple and efficient construction and includes a lower vertical height and upper surface free of protrusions to allow a tailgate of the host vehicle to be rested against the vehicle hitch without damage. These and other features of the present invention hitch represent substantial improvements over the prior art devices.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in securing a cart or other load having an upper tube and a spaced-apart lower tube, a vehicle hitch comprising:
    a base plate having means for attachment to a vehicle;
    a vertical support secured to said base plate;
    a top plate secured to said vertical support above said base plate;
    an angled front plate extending between said top plate and said base plate;
    a saddle plate secured to said base plate and spaced from said front plate to form a lower channel between said saddle plate and said front plate;
    a pair of latch arms each pivotally secured to said vertical support and each defining an upwardly open notch therein, said latch arms pivotable between a lock position and an open position;
    a cam plate joined to said pair of latch arms; and
    spring means coupled to said latch arms for urging said arms toward said locked position.

2. A vehicle hitch as set forth in claim 1 including an elongated handle joined to one of said latch arms.

3. A vehicle hitch as set forth in claim 2 wherein said handle is angled downwardly with respect to said one of said latch arms to facilitate foot operation thereof.

4. A vehicle hitch as set forth in claim 3 wherein said cam plate is angled downwardly with respect to said latch arms.

5. A vehicle hitch as set forth in claim 4 wherein said spring means includes a torsion spring coupled between one of said latch arms and said vertical support.

6. A vehicle hitch as set forth in claim 5 wherein said vertical support includes a pivot cylinder extending outwardly from each side thereof and wherein said pair of latch arms are pivotally secured thereto to form said pivotal attachment.

7. A vehicle hitch as set forth in claim 6 wherein said torsion spring includes a coil portion encircling a portion of said pivot cylinder, a first end coupled to one of said latch arms and a second end coupled to said vertical support.

8. A vehicle hitch as set forth in claim 7 wherein said base plate and said vertical support are substantially rectangular.

9. A vehicle hitch as set forth in claim 4 wherein said spring means includes a spring guide extending from said front plate toward said cam plate and a coil spring having one end received upon said spring guide and the remaining end joined to said cam plate.

10. A vehicle hitch as set forth in claim 1 wherein said spring means includes a torsion spring coupled between one of said latch arms and said vertical support.

11. A vehicle hitch as set forth in claim 10 wherein said vertical support includes a pivot cylinder extending outwardly from each side thereof and wherein said pair of latch arms are pivotally secured thereto to form said pivotal attachment.

12. A vehicle hitch as set forth in claim 11 wherein said torsion spring includes a coil portion encircling a portion of said pivot cylinder, a first end coupled to one of said latch arms and a second end coupled to said vertical support.

13. A vehicle hitch as set forth in claim 5 including an elongated handle joined to one of said latch arms.

14. A vehicle hitch as set forth in claim 13 wherein said handle is angled downwardly with respect to said one of said latch arms.

15. A vehicle hitch as set forth in claim 1 wherein said cam plate is angled downwardly with respect to said latch arms.

16. A vehicle hitch as set forth in claim 15 wherein said spring means includes a spring guide extending from said front plate toward said cam plate and a coil spring having one end received upon said spring guide and the remaining end joined to said cam plate.

17. For use in securing a cart or other load having an upper tube and a spaced-apart lower tube, a hitch comprising:
    a vertical support having base means for attachment to a vehicle, a top plate and a lower channel for receiving said lower tube;
    a pair of latch arms pivotally secured to said vertical support each having an upwardly open notch and each pivotable between a raised locking position for captivating said upper tube against said top plate and a lowered release position; and a return spring coupled to at least one of said latch arms urging said latch arms toward said locking position.

18. A hitch as set forth in claim 17 wherein each of said latch arms defines an end portion distanced from said vertical support and wherein said hitch further includes a cam plate joined to said end portions and having a downwardly angled surface for receiving said upper tube.

19. A hitch as set forth in claim 18 further including an elongated handle joined to one of said latch arms and extending downwardly therefrom.

20. A vehicle hitch for securing a cart or other load having an upper tube and a lower tube, said hitch comprising:

a support having means for attachment to a vehicle and a lower channel for receiving said lower tube;

a pair of pivotal latch arms having means for captivating said upper tube against said support in a raised position and releasing said upper tube in a lowered position;

a handle coupled to said latch arms movable downwardly to lower said latch arms and upwardly to raise said latch arms; and spring means coupled to said latch arms urging said latch arms upwardly.

* * * * *